Patented June 29, 1926.

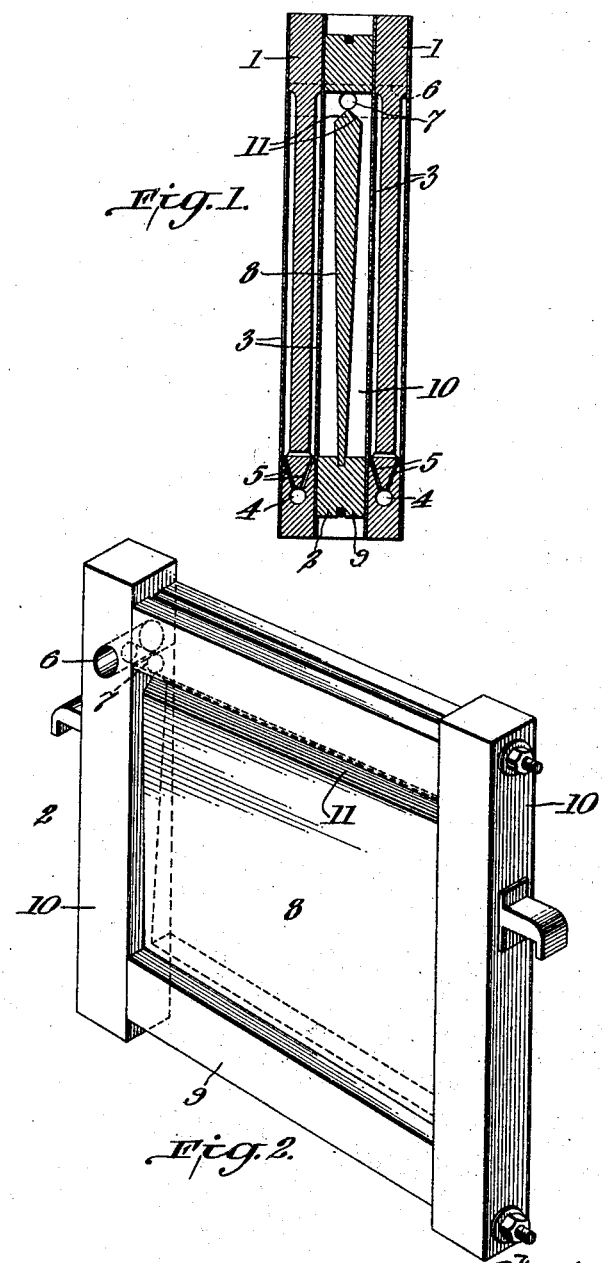

1,590,233

UNITED STATES PATENT OFFICE.

FREDERICK F. FRICK, OF ANACONDA, MONTANA.

FILTER.

Application filed May 5, 1923. Serial No. 636,981.

This invention relates to filters and is especially applicable to pressure filters of the plate and frame type.

In carrying out the process of filtering in a press which comprises one or more chambers having opposite sides formed by filtering material, the pulp may be forced in until each chamber is entirely filled with solids or the supply of pulp may be shut off when the chambers are only partly full and a space remains between the two cakes which have formed on the opposed walls of filtering material. If the chambers are filled to capacity, the washing of the solids takes place by the "cross" or "through" method, i. e. washing solutions are introduced behind one filter medium, pass through the filter medium, through the whole thickness of the cake and then through the opposite filter medium. Obviously considerable time may be required to fill the chambers with solids as the filtration rate decreases as the frame fills, and the washing may be slow as the washing solutions must be forced through the whole thickness of the cake. When the chambers are but partly filled with solids the washing takes place by the "center" method, i. e. the washing solution is introduced through the same inlet as that through which the pulp entered and passes through the cakes and the filter mediums which support them. This method of filtration and washing is more rapid than the "cross" washing method but certain disadvantages are encountered, due to the tendency for the bottoms of the chambers to become partly filled with solids which settle from the pulp during the formation of the cakes and due to the mixing of each wash with that portion of the preceding solution or wash left in the chamber. This mixing of the solution and washes arises from the fact that in order to avoid cracking of the cakes and poor washing, the washes must follow the solution and each other without draining the space between the cakes; i. e. air must not be blown thru the cakes until washing is complete.

It is an object of this invention to provide a filter in which the "center" washing method may be employed with a substantial elimination of the disadvantages above noted. More specifically, an object of the invention is to provide a frame having a member so arranged therein that when the frame is placed between two filter plates, the member forms a substantially vertical filler in the filter chamber.

In the drawings which illustrates one embodiment of my invention,

Fig. 1 is a vertical section through a filter chamber formed by a frame and the two adjoining filter plates; and Fig. 2 is a perspective view of a frame in which my invention is incorporated.

In the plate and frame type of pressure filter which is shown in Fig. 1, the filter chambers are formed by a plurality of filter plates 1 and frames 2 arranged alternately upon a suitable support. The opposite sides of the plates 1 are provided with a filtering medium 3 and the central portion of the plates is recessed in any desired fashion to provide channels through which the filtrate may flow to the lower part of the plate. The several plates may be provided with separate outlet passages 4 which communicate with the lower part of the respective plates by passages 5, or if desired, the filtrate from the several plates may have a common outlet through a suitable passage extending longitudinally through the press.

The opposed filtering mediums of two adjacent plates 1 form two walls of a filter chamber and the remaining walls of the chamber are formed by the frame 2. The conduit though which the pulp enters is formed by openings 6 in the upper portions of the several frames and by similar openings formed in the several plates. A port 7 which is provided in the wall of the frame near the top thereof communicates with the opening 6 and serves as a passage for the introduction of pulp into the filter chamber.

The above-described details of construction form no part of my invention, however, and are included merely for the purpose of describing one specific form of filter chamber in which the "center" method of washing may be practiced. To eliminate the observed disadvantages of the "center washing method," I provide the frame with a central filler 8 which is somewhat shorter than the height of the space within the frame and which contacts with the bottom and side walls of the frame. In the embodiment of my invention which I have illustrated in the drawings, the filler 8 comprises a wedge-shaped member having substantially plane surfaces arranged with the narrow part of the wedge set into a recess formed in the upper face of the bottom bar 9 of the frame. The side edges of the filler engage the inner faces of the side bars 10 of the frame and the top of the filler which is formed by two oppositely inclined faces 11, 11 is located substantially in line with the lower edge of the inlet port 7. The several bars of the frame and the filler plate 8 may be formed of wood or of any other suitable or desired material.

The function of the filler plate 8 is the displacement of pulp during the formation of the cakes and of wash solutions during the washing of the cakes. In forming the cakes, the volume of pulp passed into the filter press is adjusted to leave a small space between the inside surface of the cakes and the filler so that an even distribution of the wash solutions may be attained. The filler plate reduces the volume of pulp from which settling may occur during the filtering step and also reduces the volume of pulp or wash solution which would be diluted by succeeding washes. The filler plate should occupy substantially all of the space within the frame which is not necessary for the passage of pulp and wash solutions through the frame.

It will be understood that the invention is not limited to a particular type of filter press nor to the specific form of the filler which I have described, since a filler may be employed in the filter chambers of various types of filter presses and the filler may take such form as experimental tests on particular materials may prove to be most suitable.

I claim:

1. A filter frame comprising a peripheral wall defining the space which will constitute a filter chamber when filter plates are placed against the opposite faces of said frame, and a member having substantially plane surfaces located between said opposite faces and occupying substantially all of the space which is not necessary for the passage of pulp and wash solutions through the frame in center filtering operations, the bottom and sides of said member contacting with said peripheral wall and the top of said member not contacting therewith.

2. A filter frame comprising members adapted to form the peripheral walls of the filter chamber when the frame is placed between two filter plates, an inlet port in one of said members and opening into the space defined by said members, and a filler having substantially plane surfaces and being of less height than the space defined by said members, the bottom and sides of said filler contacting with said members, said filler being thicker at the top than at the bottom.

In testimony whereof, I affix my signature.

FREDERICK F. FRICK.